(12) United States Patent
Kohl et al.

(10) Patent No.: US 7,874,618 B2
(45) Date of Patent: Jan. 25, 2011

(54) VEHICLE SEAT WITH A DEFORMABLE BACKREST

(75) Inventors: Josef Kohl, Hirschau (DE); Christian Erker, Usingen (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 11/279,217

(22) Filed: Apr. 10, 2006

(65) Prior Publication Data

US 2007/0080570 A1 Apr. 12, 2007

(30) Foreign Application Priority Data

Apr. 15, 2005 (DE) .................. 10 2005 017 713

(51) Int. Cl.
*A47C 7/46* (2006.01)
(52) U.S. Cl. .................. 297/284.4; 297/284.8; 297/341
(58) Field of Classification Search .............. 297/284.4, 297/284.8, 341
See application file for complete search history.

(56) References Cited

U.S. PATENT DOCUMENTS

| | | | | |
|---|---|---|---|---|
| 332,237 | A * | 12/1885 | Curtiss | ................. 297/321 |
| 1,414,637 | A | 5/1922 | Gell | |
| 2,423,816 | A * | 7/1947 | Renkes | ................. 297/343 |
| 2,981,314 | A | 4/1961 | Eklof et al. | |
| 3,224,808 | A * | 12/1965 | Spielman | ............... 297/341 |
| 4,286,765 | A | 9/1981 | Delgleize et al. | |
| 4,452,486 | A * | 6/1984 | Zapf et al. | ................. 297/343 |
| 4,469,374 | A * | 9/1984 | Kashihara et al. | ........ 297/284.4 |
| 4,645,169 | A | 2/1987 | Mischer | |
| 4,729,539 | A | 3/1988 | Nagata | |
| 4,822,094 | A | 4/1989 | Oldfather et al. | |
| 4,842,333 | A | 6/1989 | Meiller | |
| 4,946,145 | A | 8/1990 | Kurabe | |
| 5,125,631 | A | 6/1992 | Brodersen et al. | |
| 5,176,355 | A | 1/1993 | Carter | |
| 5,533,703 | A | 7/1996 | Grassle et al. | |
| 5,558,399 | A * | 9/1996 | Serber | ................. 297/284.4 |
| 5,735,509 | A | 4/1998 | Gryp et al. | |
| 6,371,456 | B1 | 4/2002 | Ritchie et al. | |
| 6,554,360 | B1 * | 4/2003 | Wilke et al. | ................. 297/342 |

(Continued)

FOREIGN PATENT DOCUMENTS

DE 2064419 7/1972

(Continued)

*Primary Examiner*—Laurie K Cranmer
(74) *Attorney, Agent, or Firm*—Black Lowe & Graham, PLLC

(57) ABSTRACT

The invention relates to a vehicle seat with a backrest (1) and a seat part (2a), wherein the seat part (2a) can be displaced in the forward and backward direction (4) with respect to a base frame (3, 11) and the backrest (1) has a lumbar spine region (14) which can be deformed in the forward and backward direction (13), wherein a rocker-like element (8) is provided which is arranged in the lumbar spine region (14) such that it can pivot about a horizontally running pivot axle (9), said rocker-like element extending at least partially along the longitudinal direction of the backrest, wherein the pivot axle (9) can be displaced together with the seat part (2a) in the forward and backward direction (4) and a pivotable section (8b) of the rocker-like element (8) is attached to the base frame (3, 11) in a backrest region of the base frame (3, 11).

7 Claims, 4 Drawing Sheets

U.S. PATENT DOCUMENTS

| | | |
|---|---|---|
| 6,616,116 B1 | 9/2003 | Rochau et al. |
| 7,226,127 B1 | 6/2007 | Yevko et al. |
| 7,354,107 B2 | 4/2008 | Kohl et al. |
| 7,712,836 B2 | 5/2010 | Deml |
| 2007/0080570 A1 | 4/2007 | Kohl |

FOREIGN PATENT DOCUMENTS

| | | |
|---|---|---|
| DE | 3943008 A1 | 7/1990 |
| DE | 19714576 | 10/1998 |
| EP | 1352595 | 10/2003 |
| FR | 1396937 | 5/1964 |
| JP | 06072199 A | 3/1994 |
| JP | 08067183 | 3/1995 |
| KR | 20020090377 | 12/2002 |
| WO | 9730613 | 8/1997 |
| WO | WO0021786 | 4/2000 |
| WO | 0058125 | 10/2000 |
| WO | 2005102112 | 3/2005 |

\* cited by examiner

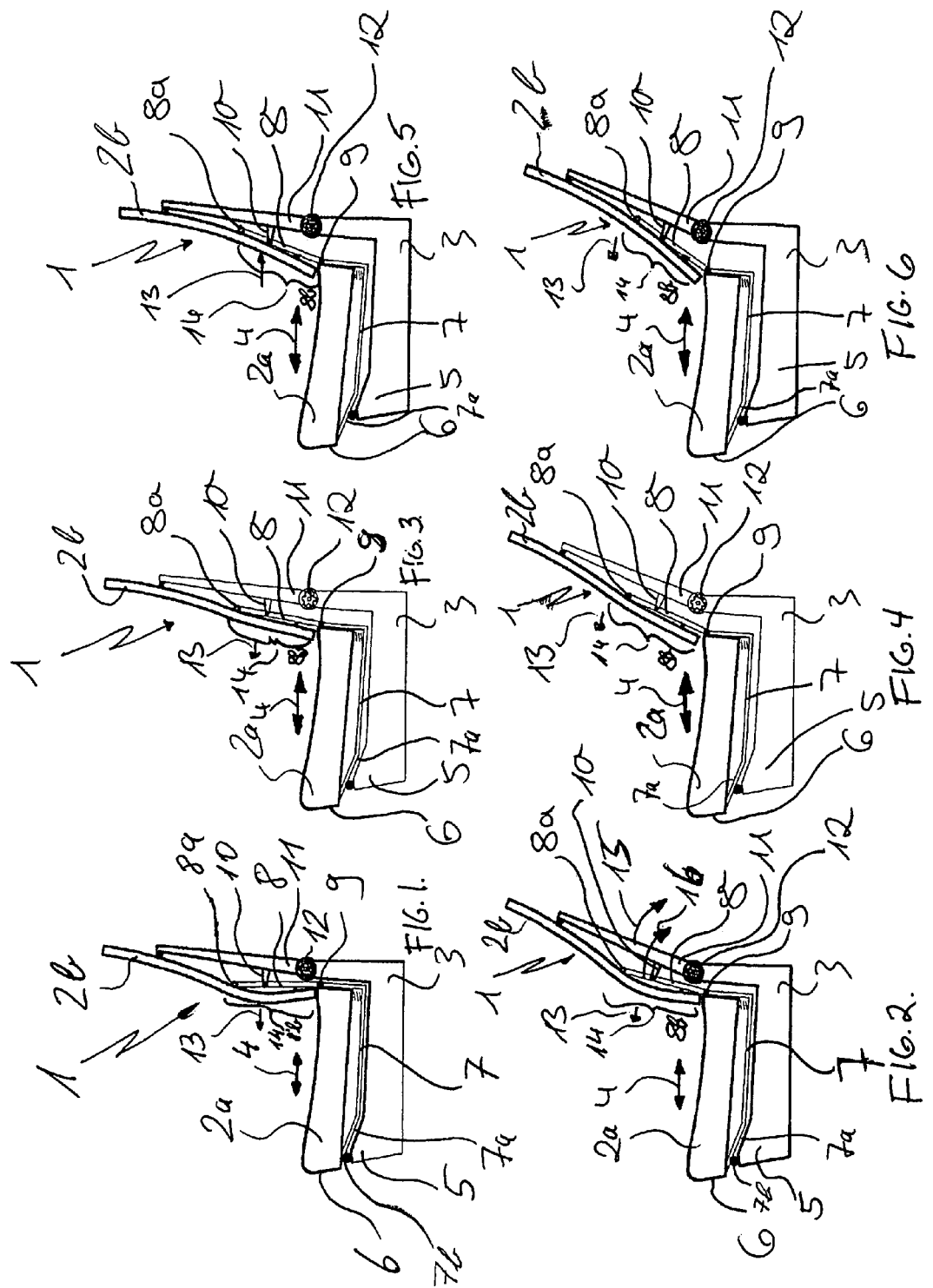

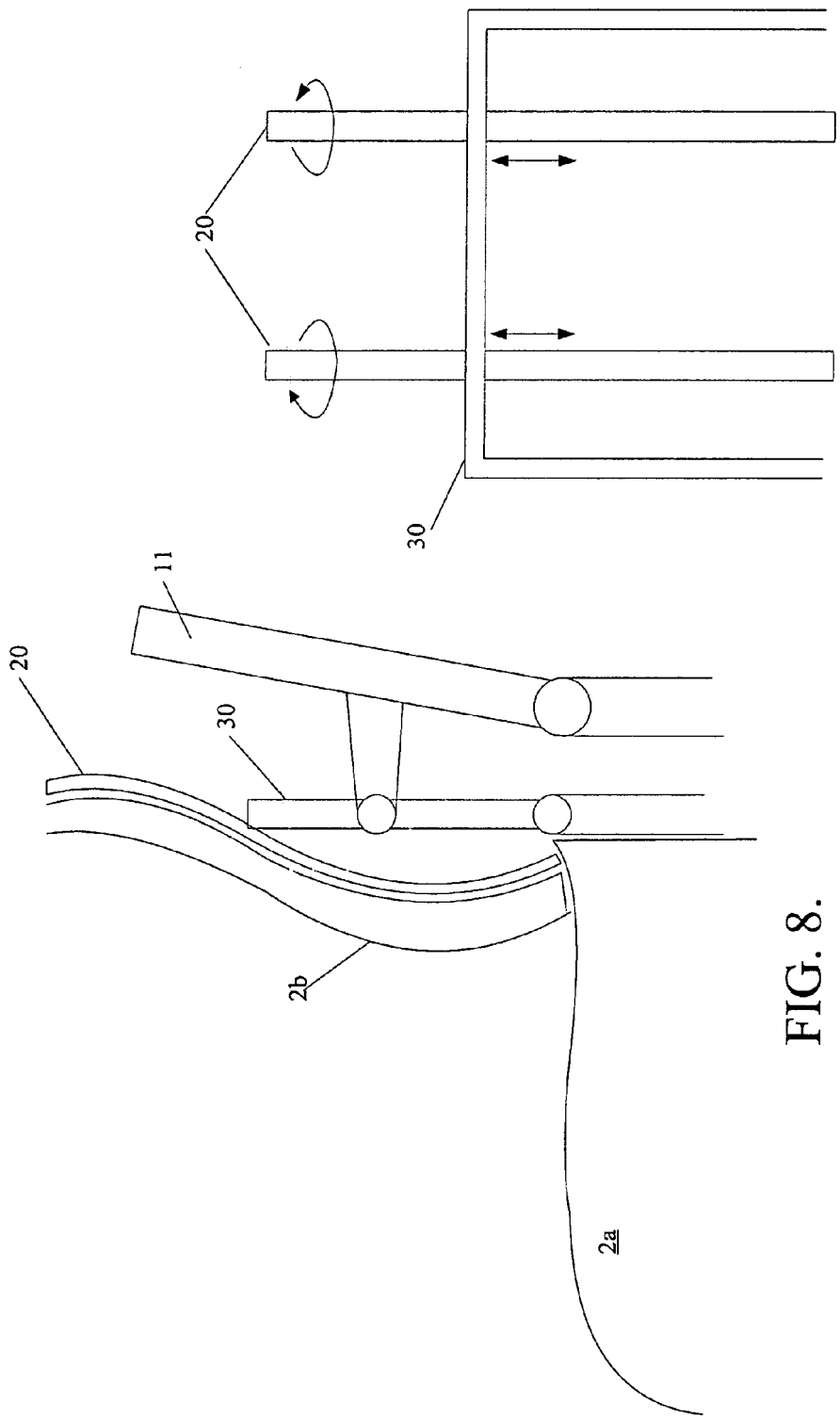

VEHICLE SEAT WITH A DEFORMABLE BACKREST

PRIORITY CLAIM

This application claims priority to German Application DE 10 2005 017 713.1 filed Apr. 15, 2005.

BACKGROUND OF THE INVENTION

EP 0 957 716 B1 discloses a vehicle seat with a backrest and a seat part, in which a lumbar support mechanism is installed in the backrest region, said lumbar support mechanism being composed of a flexible support member which is secured at its upper and lower ends and can be drawn together such that an arch forms for example in the lumbar spine region. As a result, a lumbar support is obtained which can be adjusted in the forward direction so as, by means of a convex deformation of the backrest in the lumbar spine region, to provide more or less support for the person depending on whether said person has a more or less pronounced hollow in the small of his back, in order to increase the seating comfort.

The deformation of such lumbar spine supports is preset by the person, and remains as such until the person readjusts it for example by actuating a hand-wheel, to which a Bowden cable is attached.

Such a support member has an expensive and complicated structure in so far as it requires a device for securing the support member, sliding elements, and also a plurality of support arms which extend horizontally and are connected to one another.

EP 1 082 233 B1 discloses an elastic arch element for backrests, which acts as a lordosis support. The arch element consists of an essentially sheet-like arching element part and of at least one panel with two free resilient ends which is fixedly connected to said arching element part over a small surface area, wherein, when said element part is arched, the panel serves as a support with respect to a backrest pad arranged thereon. The arching part is actuated independently of the current position of a seat part of the vehicle seat, and requires the separate actuation of actuating elements provided for this purpose.

EP 0 303 720 B1 discloses a vehicle seat with a backrest frame which is L-shaped in side view. One limb of the L-shaped backrest frame engages under a seat frame. In order to adjust the inclination of the backrest, the limb is guided by means of a pair of rails such that, during a forward movement of the seat frame, the free end of the other limb arranged in the backrest region moves in the opposite direction and downwards. In this way, a forward movement of the seat surface gives rise to automatic backward inclination of the backrest, but without thereby changing the shape of the backrest in the lumbar spine region.

SUMMARY

Accordingly, the object of the present invention is to provide a vehicle seat with a backrest and a seat part, in which a forward sliding movement of the seat part automatically gives rise to a lordosis-type deformation of the backrest in the lumbar spine region.

This object is achieved according to the features of Claim 1.

One essential point of the invention lies in that, in a vehicle seat with a backrest and a seat part, wherein the seat part can be displaced in the forward and backward direction with respect to a base frame and the backrest has a lumbar spine region which can be deformed in the forward and backward direction, a rocker-like element is provided which is positioned in the lumbar spine region such that it can pivot about a horizontally running pivot axle. The rocker-like element extends at least partially along the backrest in the longitudinal or height direction.

The pivot axle can be displaced together with the seat part in the forward and backward direction and a pivotable section of the rocker-like element is attached to the base frame in a backrest region of the base frame, preferably at a fixable distance therefrom. In this way, a forward movement of the seat part automatically sets a reduced lordosis position of the backrest in the lumbar spine region, which in the extreme case may even lead to a kyphosis-type deformation of the backrest in the lumbar spine region. This leads to a more comfortable seating position for the person using the vehicle seat, particularly when, together with the forward movement of the seat part, the latter is at the same time moved upwards in the region towards the front of the vehicle, by means of a sliding bearing region which is angled with respect to the seat part surface, so as to give rise to a height adjustment of the seat part in the region towards the front of the vehicle during a displacement of the seat part in the forward direction. To this end, rail elements fitted to the underside of the seat part can roll on roller-like elements with respect to the base frame.

Preferably, use is made of the mode of operation of the rocker-like element in which the forward sliding of the seat part does not give rise to any backward pivoting of the base frame in the backrest region.

According to one further development of the invention, the forward movement of the seat part is associated with a backward pivoting of the base frame in the backrest region, so that the backrest is inclined backwards and assumes a more horizontal position as the seat part slides forwards. This leads to a less lordosis-oriented desired position of the back of the person using the seat, which is achieved by the automatic pivoting of the rocker-like element. To this end, the pivot axle of the rocker-like element is ideally arranged in the rear region of the seat part and connected to the latter, so that a sliding movement of the seat part is at the same time associated with a sliding movement of the pivot axle.

Advantageously, the base frame can be pivoted in the forward and backward direction in the region of the backrest so as to carry out the pivoting movement about an axle which extends horizontally. As a result, this backrest base frame can be inclined backwards regardless of whether the seat part is or is not displaced, in order thus to obtain in particular a backward-inclined shoulder region. In the process, the lumbar spine region changes such that the lordosis effect is slightly reduced.

Preferably, the rocker-like element is covered on its front side by a backrest pad which assumes a lordosis-type or kyphosis-type shape by pivoting an upper end of the rocker-like element. To this end, the rocker-like element is designed for example as a U-shaped rod 24 (FIG. 7) or as a plate-like element 28 (FIG. 10, as viewed facing the back side of the seat), wherein both the U-shaped rod and the plate-like element can additionally assist a lordosis or kyphosis effect such that it is designed to be curved or even S-shaped in the height direction of the backrest.

According to one preferred embodiment, the rocker-like element is connected at its upper end to essentially S-shaped rods 20 (FIGS. 8 and 9) which extend along the backrest. To this end, the upper end of the rocker-like element can be displaced along the rods 20 during a pivoting movement of the rocker-like element, as a result of which the rods 20, which are mounted such that they can rotate about a respective axle extending in the longitudinal direction of the backrest, can automatically change their position with respect to the front side of the backrest by displacing the upper end of the rocker-like element. In this way, a continuous change in the S-shape can be achieved at the same time as a sliding of the seat part in the forward or backward direction.

Further advantageous embodiments emerge from the dependent claims.

BRIEF DESCRIPTION OF THE DRAWING

Advantages and expedient features can be found in the following description in conjunction with the single FIGURE.

FIGS. 1-6 show, in a schematic cross-sectional view, a total of six different positions of the backrest and seat part of a vehicle seat according to the invention;

FIGS. 7-10 illustrate various embodiments of the present invention.

DETAILED DESCRIPTION OF THE INVENTION

Figure 7:
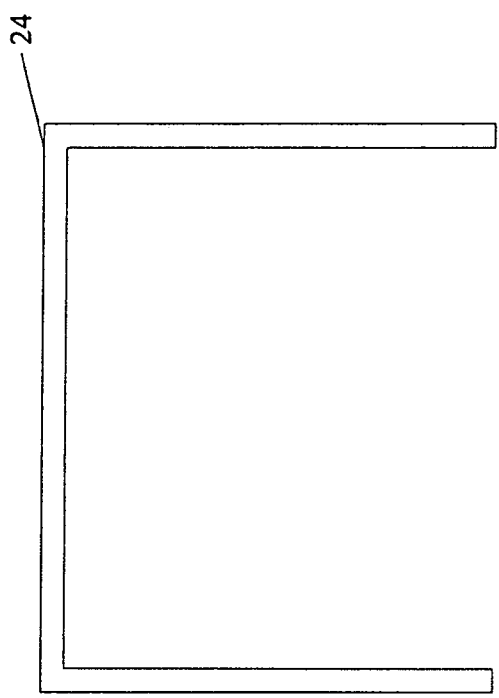
Figure 10:
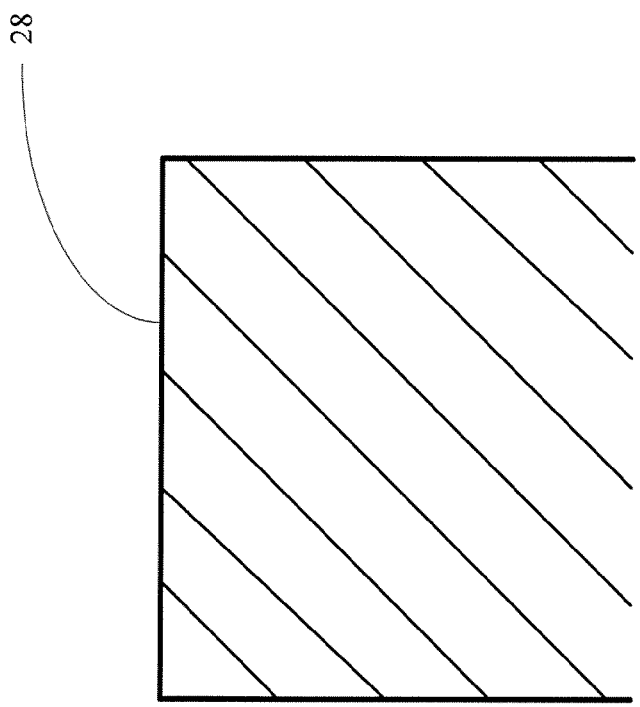

FIGS. 1 and 2 show the vehicle seat in the non-displaced position, but with a straight and inclined backrest. In FIGS. 3 and 4, the vehicle seat is shown with a displaced seat part and a non-inclined and inclined backrest. In FIGS. 5 and 6, the vehicle seat is shown with a seat part which has been displaced even further forwards and the non-inclined and inclined backrest.

FIG. 1 shows a vehicle seat with a backrest 1 and a seat part 2a, wherein the backrest has a backrest pad 2b. Both the seat part 2a and also the backrest pad 2b are arranged in a base frame 3.

The seat part 2a can be displaced in the forward and backward direction 4 by means of a sliding bearing system 7, 7a.

During such a forward displacement movement, a region 6 of the seat part 2a towards the front of the vehicle is automatically lifted since a front region of the base frame 3 is designed to be raised. As a result, the sliding bearing section 7a, which is arranged at an angle with respect to a seat part surface and may be designed as rails, rolls over roller-like elements 7b and raises the region 6 of the seat part 2a.

The upper end 8a of the rocker-like element 8 pushes against the backrest pad 2b in that it is spaced apart at a fixable distance from a pivotable part 11 of the base frame 3 by means of a spacer 10. The rocker-like element 8 is rotatably attached to the spacer 10 at a point between ends of the element 8. The spacer 10 is attached to the part 11 at a fixed angle.

In order to carry out a pivoting movement, the rocker-like element 8 has at its lower end a pivot axle 9 which is arranged in the rear region of the seat part 2a and is displaced together with the seat part 2a during a displacement movement of the latter.

The pivotable part 11 of the base frame can be pivoted about a horizontally arranged pivot axle 12. The height of a front, lordosis-type section in a lumbar spine region 14 of the backrest 1 corresponds approximately to the height 8b of the rocker-like element 8.

The end 8a gives rise to an arching of the backrest pad 2b in the lumbar spine region 14, as shown by the arrow 13.

In FIG. 2, the vehicle seat is shown with a non-displaced seat part and a pivotable part 11 which has been pivoted backwards.

On account of the fixable spacer 10, the backward pivoting of the part 11 of the base frame 3 simultaneously gives rise to a backward pivoting of the rocker-like element 8, as shown by reference 16. As a result, there is no change or at most only a slight change in the S-shape of the backrest 1 since the S-shape is defined by S-shaped rods (not shown here) which extend from top to bottom along the backrest and change their position when necessary.

This is because, since such S-shaped rods are connected to the rocker-like element 8 in the upper region 8a thereof by means of a sliding element, said rods would rotate about an essentially vertically running axle as this upper end 8a is pivoted backwards, which leads to the lordosis-type and kyphosis-type deformation region of the S-shaped backrest pad being changed in terms of its arched shape.

In FIG. 3, the vehicle seat is shown with the seat part 2a displaced forwards. As can clearly be seen from this diagram, a forward displacement movement of the seat part 2a automatically gives rise to a height adjustment of the region of the seat part 2a towards the front of the vehicle, in order thus to obtain a higher level of seating comfort with the backrest being inclined backwards at the same time.

In FIG. 4, the vehicle seat is shown in the same sliding position of the seat part as in FIG. 3. Compared to FIG. 3, the vehicle seat according to FIG. 4 additionally shows the backward-inclined part 11 of the base frame 3, as a result of which an additional inclination of the backrest 1 as a whole is produced. To this end, the rear of the backrest pad 2b slides in its upper region along the part 11 during the pivoting movement, with the spacer mounted therebetween.

It can be seen from both FIG. 3 and FIG. 4 that there is a less pronounced lordosis-type deformation of the backrest in the lumbar spine region 14 of the backrest than there is in the case of a non-displaced seat part 2a as shown in FIGS. 1 and 2. This meets the seating comfort demands of a person using the vehicle seat, since with the seat in the upright position an increased lordosis form is desired in the lumbar spine region, whereas, when the backrest is inclined backwards, which is associated with the forward sliding of the seat part 2a, a less pronounced lordosis form of the lumbar spine region of the backrest is desired.

In FIGS. 5 and 6, the vehicle seat is shown with the seat part 2a displaced even further forwards, wherein in FIG. 6 the backrest part 11 of the base frame 3 has once again been additionally pivoted backwards. It can clearly be seen from these two diagrams that, with the seat part 2a displaced further forwards, a kyphosis position of the backrest pad is automatically set, which is desired and perceived as comfortable when the user's upper body is inclined backwards as a result of the backward-inclined position of the backrest due to the seat part being displaced forwards.

FIGS. 1-6 show that the spacer 10 makes an upper and a lower angle with the rocker-like element 8. In FIGS. 1-2 the lower angle is less than 90° (acute angle) when the backrest pad 2b is in a lordosis shape. In FIGS. 5, 6 the lower angle is greater than 90° (obtuse angle) when the backrest pad 2b is in a kyphosis shape.

The rocker-like element 8 can be locked by means of a locking device (not shown here) in order to fix its current position and optionally also the position of the backrest part of the base frame. Alternatively or in addition, a locking device may be fitted on the seat part such that displacement of the latter is no longer possible.

All of the features disclosed in the application documents are claimed as essential to the invention in so far as they are novel individually or in combination with respect to the prior art.

The invention claimed is:

1. A vehicle seat with a backrest and a seat part, wherein the seat part can be displaced in the forward and backward directions with respect to a base frame and the backrest has a lumbar spine region which can be deformed in the forward and backward directions, the seat comprising:

a first pivot axle attached to the seat part;

a rocker element which is arranged in the lumbar spine region such that the rocker element is attached at a first end to the first pivot axle, said rocker element extending at least partially along the longitudinal direction of the backrest, wherein the first pivot axle can be displaced together with the seat part in the forward and backward directions;

a backrest frame being rotatably attached to the base frame at only a single point axle;

a post having one end fixedly attached to the backrest frame;

a second pivot axle located on a second end of the post, wherein the rocker element is rotatably attached to the second pivot axle of the post at a point between ends of the rocker element, wherein the rocker element is covered on a front side by a backrest pad which is transitional between a lordosis and kyphosis shape by changing an angle between the rocker element and the post.

2. The vehicle seat according to claim 1, wherein the seat part includes a sliding bearing region, which is angled with respect to the surface of the seat part, said sliding bearing region being provided to bring about height adjustment of a portion of the seat part during a displacement of the seat part in the forward direction.

3. The vehicle seat according to claim 1, wherein the rocker element is designed as a U-shaped rod.

4. The vehicle seat according to claim 1, wherein the rocker element is designed as a plate element.

5. The vehicle seat according to claim 1, further comprising one or more S-shaped rods that extend along the backrest pad, wherein the rocker element is connected at its upper end to the S-shaped rods.

6. The vehicle seat according to claim 5, wherein the upper end of the rocker element can be displaced along the rods during a pivoting movement of the rods, the pivoting movement of the rods alters the shape of the backrest pad.

7. The vehicle seat according to claim 6, wherein by displacing the upper end of the rocker element, the rods can be rotated about a respective axle extending in the longitudinal direction of the backrest.

* * * * *